(12) United States Patent
Miedema

(10) Patent No.: US 7,133,757 B2
(45) Date of Patent: Nov. 7, 2006

(54) ASSEMBLY AND AN AUTONOMOUS AGRICULTURAL MACHINE FOR PERFORMING AN AGRICULTURAL OPERATION, IN PARTICULAR CROP PROCESSING

(75) Inventor: Theo Jan Miedema, De Lier (NL)

(73) Assignee: Lely Enterprises AG, Maassluis (NL)

( * ) Notice: Subject to any disclaimer, the term of this patent is extended or adjusted under 35 U.S.C. 154(b) by 0 days.

(21) Appl. No.: 10/250,127

(22) Filed: Jun. 5, 2003

(65) Prior Publication Data

US 2003/0229434 A1    Dec. 11, 2003

(30) Foreign Application Priority Data

Jun. 6, 2002    (NL)    ................................. 1020808

(51) Int. Cl.
*G06F 19/00*    (2006.01)
*G05D 1/02*    (2006.01)

(52) U.S. Cl. .................... 701/50; 701/26; 701/213; 172/5; 56/10.2 R

(58) Field of Classification Search .................. 701/50, 701/1, 213, 23, 24, 25, 26; 56/10.2 R, 10.2 A, 56/10.2 H; 172/5; 460/1
See application file for complete search history.

(56) References Cited

U.S. PATENT DOCUMENTS

| | | | |
|---|---|---|---|
| 4,769,700 A | | 9/1988 | Pryor |
| 5,848,368 A | * | 12/1998 | Allen et al. .................... 701/50 |
| 6,082,084 A | | 7/2000 | Reamers et al. |
| 6,119,442 A | * | 9/2000 | Hale ........................ 56/10.2 H |
| 6,246,932 B1 | * | 6/2001 | Kageyama et al. ............ 701/24 |
| 6,778,097 B1 | * | 8/2004 | Kajita et al. ............ 340/825.69 |
| 6,778,894 B1 | * | 8/2004 | Beck et al. .................... 701/50 |
| 2002/0065607 A1 | * | 5/2002 | Kunzeman et al. .......... 701/213 |
| 2002/0091476 A1 | * | 7/2002 | Beck ............................ 701/50 |

FOREIGN PATENT DOCUMENTS

| | | |
|---|---|---|
| CH | 677761 A | 6/1991 |
| DE | 2638259 A | 9/1978 |
| DE | 2914605 A | 10/1980 |
| DE | 19704374 A | 8/1998 |
| DE | 19932552 A | 2/2000 |

* cited by examiner

*Primary Examiner*—Tan Q. Nguyen
(74) *Attorney, Agent, or Firm*—Jacobus C. Rasser; Howrey, LLP

(57) ABSTRACT

An assembly for performing an agricultural operation, in particular crop processing. The assembly is provided with an autonomous agricultural machine that is movable over a parcel for performing the agricultural operation and with a control unit for controlling the functioning of the autonomous agricultural machine. The control unit is provided with a memory containing sound-standard data. The control unit controls the functioning of the autonomous agricultural machine with the aid of the sound-standard data. An autonomous agricultural machine for performing the agricultural operation. The autonomous agricultural machine is provided with a control unit for controlling the functioning of the autonomous agricultural machine, with a position-determining system for determining the momentary position of the agricultural machine in the parcel, and with a sound meter. The control unit is provided with a memory containing sound-standard data. The control unit controls the functioning of the autonomous agricultural machine with the aid of the sound-standard data and/or data from the sound meter.

22 Claims, 1 Drawing Sheet

ASSEMBLY AND AN AUTONOMOUS AGRICULTURAL MACHINE FOR PERFORMING AN AGRICULTURAL OPERATION, IN PARTICULAR CROP PROCESSING

CROSS REFERENCE TO RELATED APPLICATIONS

This application claims priority from Dutch patent application no. 1020808 filed 6 Jun. 2002, the contents of which are hereby incorporated by reference in their entirety.

BACKGROUND OF INVENTION

1. Field of the Invention

The invention relates to the field of agriculture and to assemblies for performing an agricultural operation, in particular crop processing.

2. Description of the Related Art

Assemblies for performing agricultural operations, in particular crop processing, are generally known. Such operations often generate considerable amounts of noise. Additionally, due to the nature of these operations they may sometimes be carried out at inconvenient times such as early in the morning or late at night causing possible noise-nuisance. The invention aims at providing an alternative assembly which seeks to overcome the above mentioned problem.

SUMMARY OF INVENTION

For this purpose, according to the invention there is provided an assembly for performing an agricultural operation, in particular crop processing, the assembly comprising an agricultural machine that is movable over a parcel for performing the agricultural operation and a control unit for controlling the functioning of the autonomous agricultural machine, the control unit being provided with a memory containing sound-standard data and controlling the functioning of the autonomous agricultural machine with the aid of the sound-standard data. In the known assembly it is the driver of the agricultural machine who is responsible for observing laws with respect to noise nuisance. By making use, according to the invention, of a memory containing sound-standard data, it is also possible to use an autonomous agricultural machine for performing an agricultural operation without breaking noise nuisance laws.

In an embodiment of an assembly according to the invention the autonomous agricultural machine is suitable for performing the agricultural operation in various modes, the control unit controlling the autonomous agricultural machine in such a way that the agricultural operation is performed in one of the modes with the aid of the sound-standard data. In this manner it is possible to select a mode of performing by means of which the allowed sound production is not exceeded.

The memory contains in particular sound-standard data per point of time. The allowed sound production depends for example on the point of time of the day and/or the day and the season.

As the allowed sound production varies in some cases according to the distance from a particular object, for example a residential area, in an embodiment of an assembly according to the invention it is advantageous if the assembly is provided with a position-determining system for determining the momentary position of the agricultural machine in the parcel. The memory then preferably contains sound-standard data per position.

As the sound production of an agricultural machine is not always constant, it is advantageous if the assembly is provided with a sound meter. In this case the control unit preferably controls the functioning of the autonomous agricultural machine partially with the aid of data from the sound meter.

In an embodiment of an assembly according to the invention the sound meter is disposed on the autonomous agricultural machine. The control unit is preferably disposed on the autonomous agricultural machine.

The invention also relates to an autonomous agricultural machine for performing the agricultural operation, in particular crop processing, the autonomous agricultural machine being provided with a control unit for controlling the functioning of the autonomous agricultural machine, with a position-determining system for determining the momentary position of the agricultural machine in the parcel, and with a sound meter, the control unit being provided with a memory containing sound-standard data, the control unit controlling the functioning of the autonomous agricultural machine with the aid of the sound-standard data and/or data from the sound meter.

The invention also provides for a method for controlling the sound emission of an agricultural machine that is movable over an agricultural parcel for performing an agricultural operation comprising: providing a memory containing sound-standard data; providing a control unit for controlling the agricultural machine; and controlling the agricultural machine with the aid of the sound-standard data.

BRIEF DESCRIPTION OF DRAWINGS

An embodiment of the invention will now be explained in further detail by way of example only, with reference to the accompanying FIGURE, in which.

DETAILED DESCRIPTION

Figure 1:
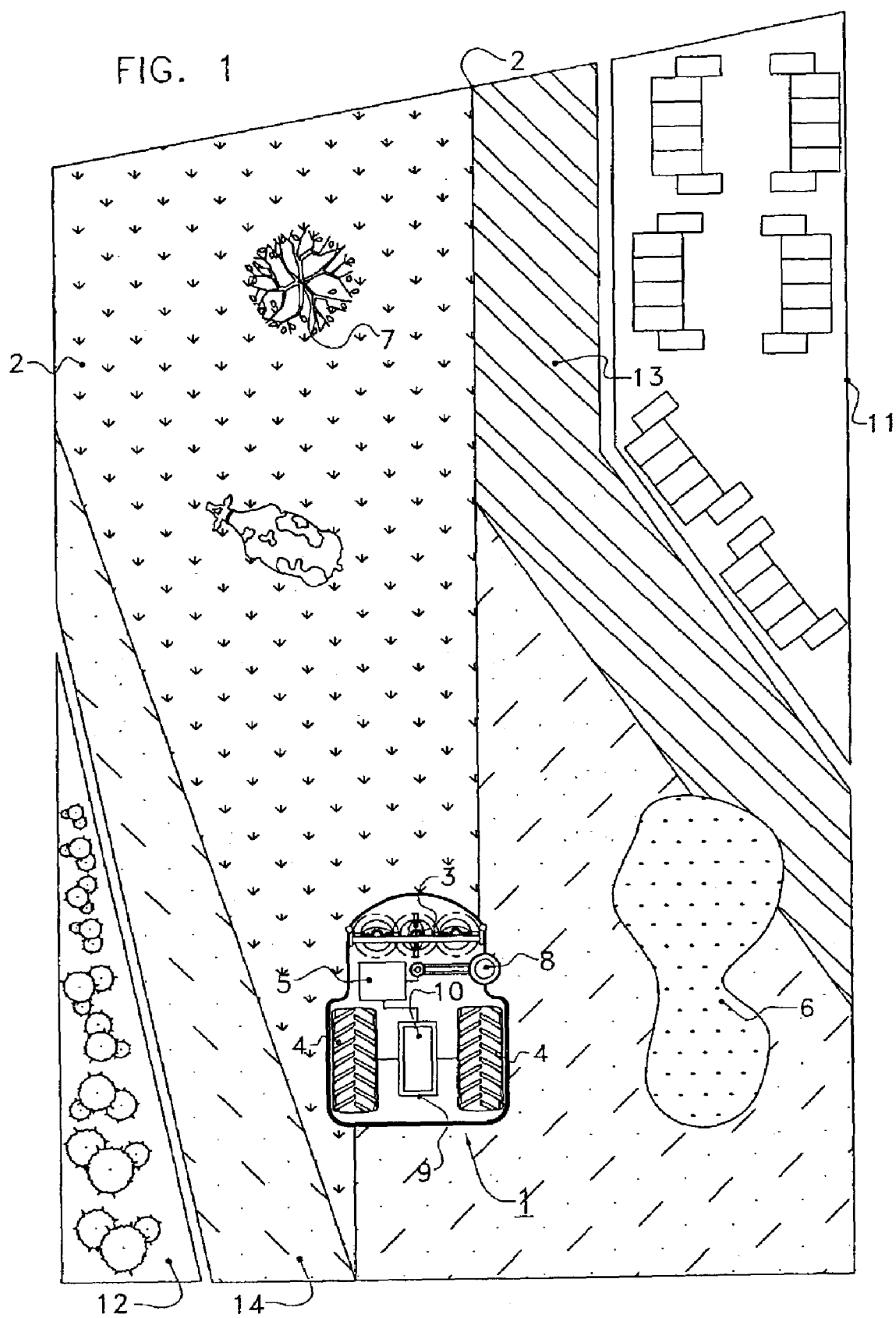
FIG. 1 shows schematically in plan view an autonomous agricultural machine in an agricultural parcel in an embodiment of an assembly according to the invention.

FIG. 1 shows schematically in plan view an autonomous agricultural machine 1 in an agricultural parcel 2 in an embodiment of the invention. It is pointed out here that an autonomous machine, i.e. a machine that does not require a driver for being moved, is known per se and will not be set out here in further detail for the sake of simplicity of the description. Such an autonomous machine may for instance be of the type described in U.S. Pat. No. 4,769,700 the contents of which are hereby incorporated by reference in their entirety.

Various aspects of an autonomous machine are also disclosed in co-pending U.S. patent applications Ser. No. 10/250,099 entitled "An Agricultural Machine for Performing an Agricultural Operation"; Ser. No. 10/250,101 entitled "An Agricultural Machine for Performing Crop Processing"; Ser. No. 10/250,121 entitled "An Autonomous Agricultural Machine for Performing an Agricultural Operation, in Particular Crop Processing"; Ser. No. 10/250,105 entitled "A Device for Crop Processing"; Ser. No. 10/250,126 entitled "An Assembly for Performing Crop Harvesting"; Ser. No. 10/250,128 entitled "A System for and a Method of Performing a First and a Second Agricultural Operation on an Agricultural Parcel"; Ser. No. 10/250,131 entitled "An Assembly for Performing an Agricultural Operation, in Particular Crop Processing"; and Ser. No. 10/250,104 entitled "An Agricultural Machine for Performing an Agricultural Operation, in Particular Crop Processing", all of which claim priority in the Netherlands on 6 Jun. 2002, the contents of all of which are hereby incorporated by reference in their entirety.

The autonomous agricultural machine 1 is suitable for performing an agricultural operation on the agricultural parcel 2. In the embodiment shown the autonomous agricultural machine 1 is an autonomous mowing machine that mows crop present on the agricultural parcel 2 by means of a mowing unit 3 known per se. Although several sorts of mowing units known per se may be used, in the embodiment shown the mowing unit 3 is constituted by mowing discs that are present on a cutter bar and are rotatable about an axis, which mowing discs are provided with mowing knives. It will be obvious that the agricultural machine can also be an agricultural machine for performing other crop processing operations.

The agricultural machine 1 is supported and moved over the agricultural parcel 2 by means of wheels 4.

The agricultural machine 1 further comprises a position-determining device 5 known per se for determining the position of the autonomous agricultural machine 1 in the agricultural parcel 2 by means of for example a GPS system. Said position-determining device 5 can also be used as direction-of-travel-determining device for determining the direction of travel of the agricultural machine 1. In the present case the position-determining device is provided with a memory suitable for containing information with respect to the agricultural parcel 2, such as information with respect to the position of a tree 7 and a pond 6 in the agricultural parcel 2. Said information may be stored for example in the form of a ground plan, in which the parts 6, 7 of the agricultural parcel 2 are indicated. This makes it possible to take relevant displacement measures when the agricultural machine 1 approaches the pond 6 or the tree 7.

The autonomous agricultural machine 1 further comprises a sound meter 8 for measuring the sound level produced by the agricultural machine 1, i.e. the drive of the agricultural machine and the processing unit, i.e. the mowing unit 3.

The autonomous agricultural machine 1 further comprises a control unit 9 for controlling the functioning of the autonomous agricultural machine 1. The control unit 9 is provided with a memory 10 containing sound-standard data. In the present context, sound standard data may include all data related to sound levels associated with use of the machine. In particular, this may include sound-standard data per point of time and per position giving maximum levels of sound which may not be exceeded. It may also include sound standard data related to different conditions of the agricultural machine 1 and different modes of operation of the agricultural machine 1. It may also include sound standard data related to different climatic conditions including humidity, temperature and wind direction. In the embodiment shown a residential area is indicated for example by the reference numeral 11. Because of the sound-standards, in the shaded portion 13 of the agricultural parcel, that is regarded as evening quiet area 13, less sound should be produced for example in the evening and the night. Said time data (season-dependent, if desired, or day-dependent, for example Sunday rest in certain religious areas) can be inputted in the memory 10, and the control unit 9 can then decide with the aid of this data not to mow in the evening quiet area 13 at the relevant points of time, or (if the mowing unit is equipped therefor) to mow in such a manner that less sound is produced, for example by mowing at a lower number of revolutions.

In the shaded portion 14 of the agricultural parcel 2, that will hereinafter be referred to as young animals area 14, young animals can be expected that enter the agricultural parcel 2 from the nature reserve 12 located in the vicinity. With the aid of data stored in the memory 10 it is possible, on the contrary, to work in the young animals area whilst producing more noise, for the purpose of drawing the attention of young animals that were born after the breeding season to the fact that the agricultural machine 1 is approaching, so that these young animals are alarmed. It is possible, of course, to designate the young animals area 14 as forbidden area for the agricultural machine 1 during a certain time that is stored in the memory.

When the sound meter 8 detects an undesired increase of sound, for example as a result of a malfunction of the mowing unit 3, the control unit 9 can intervene, in dependence on the measured sound level, at any moment in the functioning of the agricultural machine 1, for example by stopping it completely.

Although in the embodiment shown the sound meter and the control unit are disposed in the agricultural machine, it will be obvious that the control unit can also be a separate control unit that controls the agricultural machine by means of a remote control element, and that the sound meter can also be disposed on relevant areas of the agricultural parcel. In particular, one or more sound meters may be located remotely at particularly sensitive locations or around the periphery of the agricultural parcel. Operation of the agricultural machine may then be controlled on the basis of the perceived sound at the remote sound meter. In such circumstances sound meters, in particular, directional sound meters may also be used to perform a position-determining function. It will further be obvious that the ways of performing the agricultural operation can differ for example in the speed at which the operation is performed, the number of elements performing the agricultural operation, etcetera.

Furthermore, although the present invention has been described in the context of agricultural vehicles and agricultural operations, the teachings are equally applicable to the control of other vehicles and machines where noise control is desired. Such situations may include aircraft, trains, road traffic, motor boats and also domestic machines such as lawn-mowers or vacuum cleaners.

Many modifications in addition to those described above may be made to the structures and techniques described herein without departing from the spirit and scope of the invention. In particular, the devices and methods disclosed herein may also be used in conjunction with further features of the above-referenced co-pending applications. Accordingly, although a specific embodiment has been described, this is an example only and is not limiting upon the scope of the invention.

The invention claimed is:

1. An assembly for performing crop processing, the assembly comprising:
    an agricultural machine that is movable over a parcel for performing the crop processing; and
    a control unit for automatically controlling the movement of the agricultural machine, the control unit comprising a memory containing sound-standard data, the control unit controlling the movement of the agricultural machine with the aid of the sound-standard data to define an allowed area of operation within the agricultural parcel in which the agricultural machine may perform the crop processing and a forbidden area of operation within the agricultural parcel in which the agricultural machine may not perform the crop processing.

2. The assembly as claimed in claim 1, wherein the agricultural machine can perform the crop processing in a number of modes, the control unit controlling the agricultural machine to perform the crop processing in one of the modes with the aid of the sound-standard data.

3. The assembly as claimed in claim 1, wherein the memory contains sound-standard data per point of time.

4. The assembly as claimed in claim 1, wherein the assembly is provided with a position-determining system for determining the momentary position of the agricultural machine in the parcel.

5. The assembly as claimed in claim 4, wherein the memory contains sound-standard data per position.

6. The assembly as claimed in claim 1, wherein the assembly further comprises a sound meter.

7. The assembly as claimed in claim 6, wherein the control unit controls the functioning of the agricultural machine with the aid of data from the sound meter.

8. The assembly as claimed in claim 6, wherein the sound meter is disposed on the agricultural machine.

9. The assembly as claimed in claim 1, wherein the control unit is disposed on the agricultural machine.

10. A self contained autonomous agricultural machine for performing crop processing on a parcel, the autonomous agricultural machine comprising:
 a sound meter;
 a position-determining system for determining the momentary position of the agricultural machine in the parcel; and
 a control unit for controlling the movement of the autonomous agricultural machine, the control unit comprising a memory containing sound-standard data, the control unit controlling the movement of the autonomous agricultural machine on the basis of the momentary position with the aid of the sound-standard data and data from the sound meter.

11. The autonomous agricultural machine as claimed in claim 10, wherein the agricultural machine can perform the crop processing in a number of modes, the control unit controlling the autonomous agricultural machine to perform the crop processing in one of the modes with the aid of the sound-standard data or data from the sound meter.

12. The autonomous agricultural machine as claimed in claim 10, wherein the memory contains sound-standard data per position.

13. The autonomous agricultural machine as claimed in claim 10, wherein the memory contains sound standard data per point of time.

14. The autonomous agricultural machine as claimed in claim 10, wherein the control unit controls the position of the autonomous agricultural machine with the aid of the sound-standard data.

15. The autonomous agricultural machine as claimed in claim 10, wherein the control unit controls the position of the autonomous agricultural machine with the aid of the data from the sound meter.

16. A method for controlling the sound emission of an autonomous agricultural machine that is movable over an agricultural parcel for performing crop processing comprising:
 providing a memory containing sound-standard data;
 providing a control unit for controlling the agricultural machine; and
 controlling the movement of the agricultural machine with the aid of the sound-standard data to perform the crop processing only in an allowed area of operation within the agricultural parcel.

17. The method as claimed in claim 16, wherein the agricultural machine is operable in a number of modes and the agricultural machine is controlled by selecting a mode of operation with the aid of the sound-standard data.

18. The method as claimed in claim 17 further comprising:
 detecting sound produced by the agricultural machine; and
 comparing the detected sound with the sound-standard data to produce a comparison result;
 wherein the mode of operation is selected with the aid of the comparison result.

19. The method as claimed in claim 16 further comprising:
 detecting sound produced by the agricultural machine; and
 comparing the detected sound with the sound-standard data to produce a comparison result;
 wherein the agricultural machine is controlled with the aid of the comparison result.

20. The method as claimed in claim 16, wherein the position of the agricultural machine within the parcel is controlled with the aid of the sound-standard data.

21. A self-contained assembly for performing crop processing, the assembly comprising:
 an agricultural machine that is movable over a parcel for performing the crop processing;
 a sound meter disposed on the agricultural machine; and
 a control unit disposed on the agricultural machine for controlling the functioning of the agricultural machine, the control unit comprising a memory containing sound-standard data, the control unit controlling the functioning of the agricultural machine with the aid of the sound-standard data to define an allowed area of operation within the agricultural parcel in which the agricultural machine may perform the crop processing and a forbidden area of operation within the agricultural parcel in which the agricultural machine may not perform the crop processing.

22. The assembly as claimed in claim 21, wherein the control unit controls the functioning of the agricultural machine with the aid of data from the sound meter.

* * * * *